Sept. 30, 1958   J. MAHLER   2,854,335
PHOTOGRAPHIC TRANSPARENCIES AND
METHOD OF MAKING THE SAME
Filed Aug. 30, 1952   3 Sheets—Sheet 1
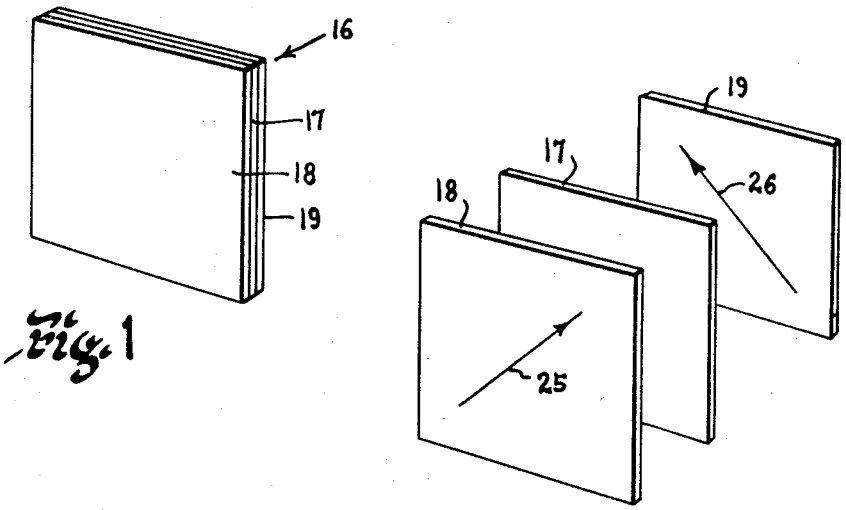
Fig. 1
Fig. 2
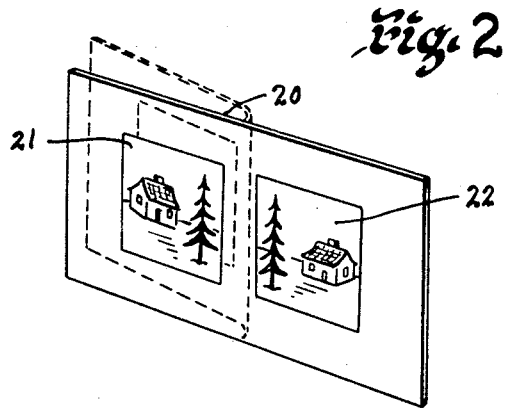
Fig. 3
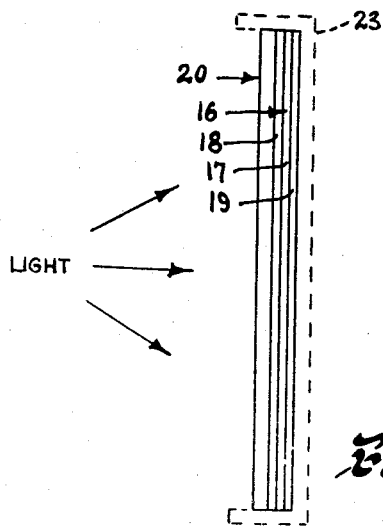
Fig. 4
INVENTOR
JOSEPH MAHLER
BY
Louis L. Gagnon
ATTORNEY

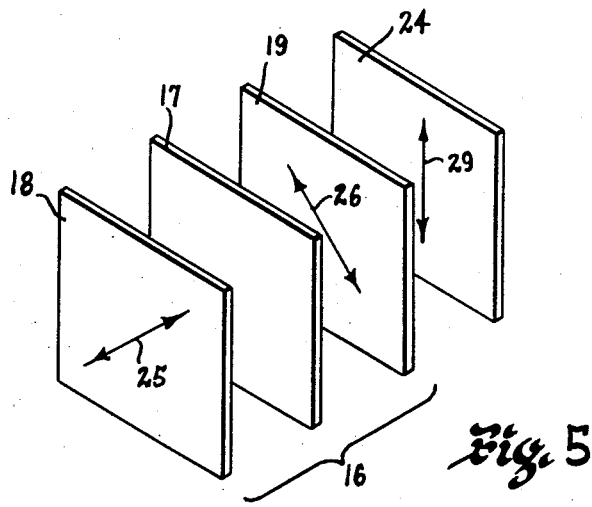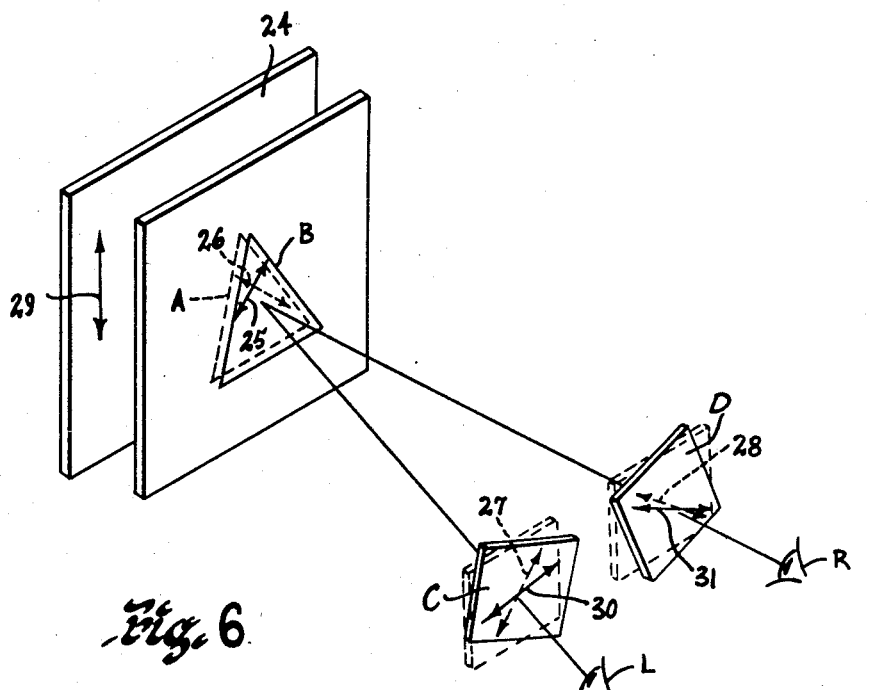

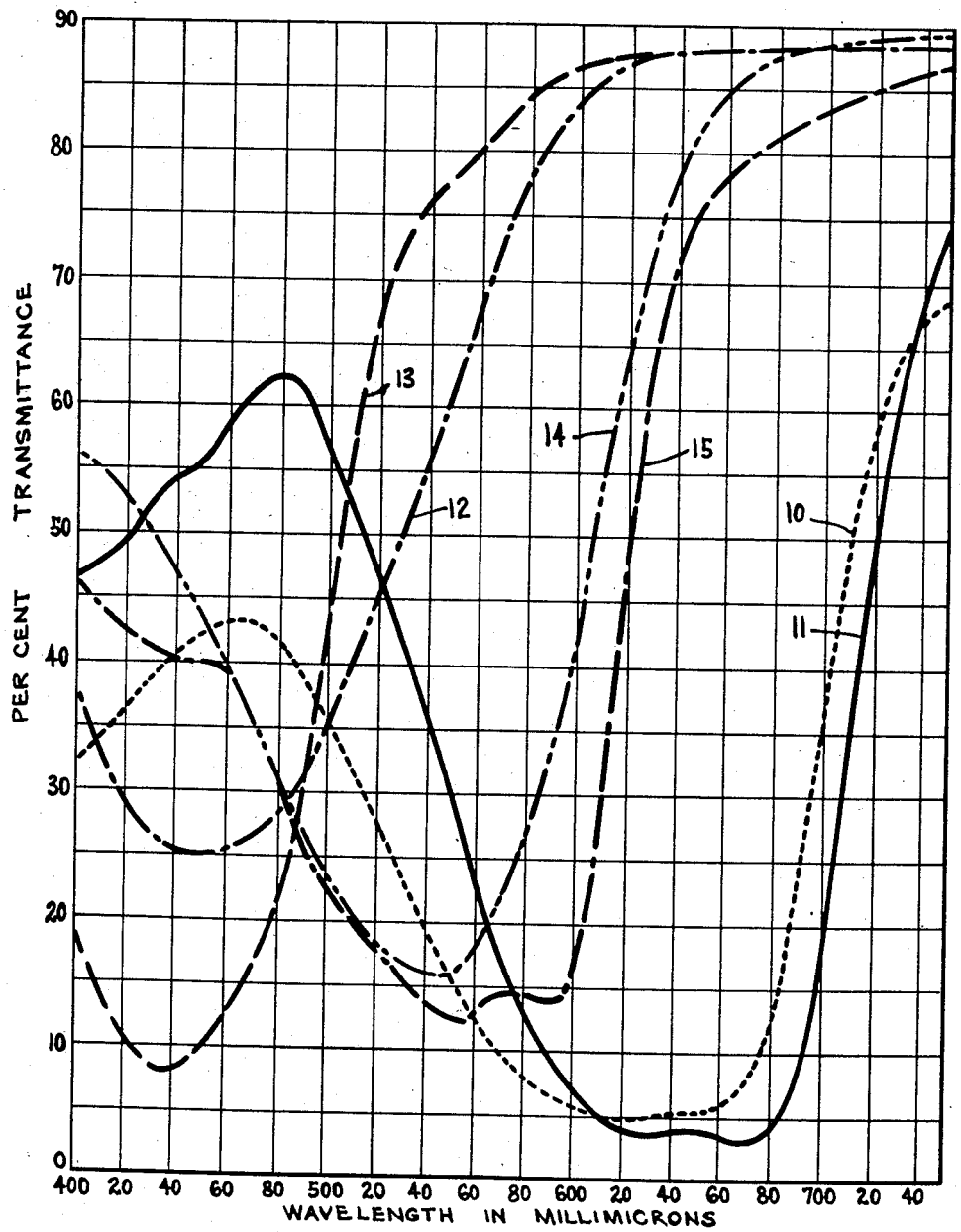

United States Patent Office 2,854,335
Patented Sept. 30, 1958

2,854,335

PHOTOGRAPHIC TRANSPARENCIES AND METHOD OF MAKING THE SAME

Joseph Mahler, Westport, Conn., assignor to American Optical Company, Southbridge, Mass., a voluntary association of Massachusetts Application August 30, 1952, Serial No. 307,235

4 Claims. (Cl. 96—13)

This invention relates to improvements in photographic transparencies and relates particularly to novel colored photographic transparencies in the form of motion picture strip film or slides formed of light-polarizing materials and method of making the same.

One of the principal objects of this invention is to provide novel means and method of coloring oriented polyvinyl alcohol or other oriented birefringent materials whereby the resultant color or colors will be of controlled shade and density and of a stable nature.

Another object is to provide a novel light-polarizing photographic transparency and method of making the same whereby the image portion of the transparency may be produced either in black and white or in colors similating those of the photographed object.

Another object is to provide a novel light-polarizing photographic transparency and method of making the same wherein the resultant picture may be formed either in black and white or colored and its polarizing characteristics so controlled that the resultant image will have three-dimensional characteristics.

Another object is to provide a novel method of making photographic transparencies from material embodying superimposed, transparent layers one of which is isotropic and the other or others birefringent, the molecules of the birefringent layer or layers being highly oriented, wherein the said birefringent layer or layers are treated with a dichroic dye or dyes in such a manner as to retain the orientation of the molecules whereby the resultant film will have light-polarizing characteristics and will possess desired color characteristics depending upon the nature of the dye or dyes employed.

Another object is to provide a film embodying at least one layer of material having its molecules in oriented relation and which may be treated with a solution for forming within the film a material of a dye-forming type which, upon exposure to ultra-violet light, may be decomposed whereby a master color separation positive may be placed in superimposed relation with said material and exposed to ultra-violet, visible, or other actinic light to cause a dye-forming sensitized pattern to remain in said material, the said material being then caused to react with a coupler or couplers to produce color throughout said pattern, said color being dependent upon the particular coupler or couplers employed, and due to the oriented relation of the molecules, said material will have light-polarizing characteristics.

Another object is to provide a colored image or picture film embodying a structure formed of an inner layer of transparent isotropic material and outer laminations of birefringent transparent material having thereon image or picture portions located in stereoscopically displaced superimposed relation and treated with a dichroic dye or dyes in such a manner as to provide them with desired colors while retaining the orientation of the molecules whereby the resultant colored picture or image portions will have light-polarizing characteristics, the respective axes of polarization of said image or picture portions being substantially at right angles to one another to provide the film with three dimensional characteristics when viewed through light-polarizing analyzers.

Another object is to provide a photographic transparency of the above character which further embodies a light-polarizing field superimposed with said image or picture portions and having its axis of polarization angled with respect to the axes of polarization of the respective image or picture portions whereby when said transparency is viewed through light-polarizing analyzers, having their respective axes of polarization altered with respect to each other and from parallelism with the axes of said image or picture portions, ghost images are rendered substantially invisible.

Other objects and advantages will become apparent from the following description taken in connection with the accompanying drawings, in which:

Fig. 1 is a perspective view of a portion of a photographic transparency embodying the invention;

Fig. 2 is an exploded view of the portion of the photographic transparency shown in Fig. 1;

Fig. 3 is a perspective view of a photographic transparency printed and developed in accordance with this invention;

Fig. 4 is an illustration of the process for exposing the photographic transparency to light;

Fig. 5 is an exploded view of the photographic transparency shown in Fig. 1 having light-polarizing means associated therewith for use in ghost image elimination;

Fig. 6 is a diagrammatic view illustrating a method of eliminating ghost images; and Fig. 7 is a graph showing the transmission curves of colored photographic transparencies produced from the preferred color forming means in accordance with this invention.

Polyvinyl alcohol is a white, tasteless, odorless powder which is the product resulting from the hydrolyzation of either polyvinyl acetate or polyvinyl chloride, and transparencies obtained from aqueous solutions or suspensions of polyvinyl alcohol are colorless, transparent and exceptionally tough, and exhibit excellent resistance to vegetable and mineral oils, simple alcohols, esters, ethers and many other organic liquids. Polyvinyl alcohol has been found to be desirable for use in the manufacture of photographic transparencies due to easy workability, low cost, and availability. However, although polyvinyl alcohol transparencies are desirable for many uses, it has been found that such transparencies are not practical in some instances due to the fact that polyvinyl alcohol is easily dissolved or softened by water, polyhydroxy alcohols, and aminoalcohols.

Accordingly, the present invention is directed to means and method of easily, efficiently, and economically forming colored photographic transparencies of polyvinyl alcohol wherein the resultant transparencies will be resistant to water, etc., and said transparencies may be provided with light-polarizing characteristics, if desired, whereby such transparencies may be used for stereoscopic three-dimensional projection. Specifically, the processes outlined hereinafter preserve the essential initial orientation of the molecules of the polyvinyl alcohol material.

Light-polarizing film is comprised, in one form, of a triple layer structure 16 as shown in Fig. 1 embodying a water insoluble base layer 17 such as cellulose butyrate, cellulose acetate or cellulose nitrate having superimposed on both sides thereof layers 18 and 19 of polyvinyl alcohol, the molecules of which are highly oriented. In such a film or transparency, the individual axes of polarization of the respective layers 18 and 19 of polyvinyl alcohol, which are birefringent, are generally positioned approximately 90° to each other and approximately 45° to the horizontal and vertical. This is illustrated in Fig. 2 wherein is shown an "exploded" view of such a transparency with the axes of the layers 18 and 19 being indicated by arrows. The base layer 18, which is isotropic, may be ultra-violet absorbing, if desired, by inclusion therein of furfuralazine or cinnamalazine or other known materials.

In accordance with this invention a transparency 16 is first immersed in a sensitizing solution formed in accordance with the following formula:

SOLUTION I

| Ingredient | Approximate Preferred Amount | Approximate Range |
|---|---|---|
| Water ccs | 250 | |
| Naphthanil diazo Blue B Salt (Dianacitine) grams | 10 | 5 to 30 |
| Sodium Phosphate Monobasic grams | 55 | 10 to 70 |

In forming the sensitizing solution, the mixture resulting from the above formula should be filtered to remove foam and large particles. Instead of sodium phosphate monobasic a similar amount of ordinary sodium chloride can be used or a combination of equal parts of sodium chloride and sodium phosphate monobasic. Also, instead of salts of the above nature, 70 ccs. of alcohol with 30 ccs. of water may be used, in which case the alcohol may be ethyl, methyl, isopropyl or the like.

Prior to immersion in the sensitizing solution the photographic transparency may, if desired, be pre-wetted by immersion in a solution formed substantially of 90 ccs. of alcohol and 10 ccs. of water, the alcohol being variable from 70 to 90 ccs. and the water accordingly from 10 to 30 ccs. Such pre-wetting has been found to provide somewhat better uniformity in the color and quality of the resultant transparencies.

The transparency is preferably immersed in Solution I for approximately 2 minutes at a temperature of approximately 70° F. The time of immersion can range, however, from 1 to 5 minutes depending upon the temperature and upon the density desired of the color to be provided. For example, with a higher temperature of about 80° F. the time cycle should be cut approximately in half.

This sensitizing procedure introduces a dye-former within the material of the polyvinyl alcohol layers, which dye-former can be readily decomposed by exposure to light.

After the film has been properly immersed in the sensitizing solution, the excess solution should be wiped off the surface of the transparency and the transparency then dipped for approximately 5 seconds in a solution formed as follows:

SOLUTION II

| Ingredient | Approximate Preferred Amount, ccs | Approximate Range, ccs |
|---|---|---|
| Alcohol | 200 | |
| Water | 50 | 25 to 50 |

By dipping the transparency in Solution II the salt which may have crystallized on the surface area of the transparency is removed. The transparency is then preferably again wiped and dried in air at room temperature for about 1 minute.

In order to produce an image on the film, three master color separation positives must be first provided by conventional photographic methods, a separate master for each of three colors, Cyan, yellow and magenta.

The master color separation positive from which the Cyan (minus red) image is to be obtained is placed, preferably in a frame, in superimposed relation with the sensitized transparency. The transparency is then exposed, through the Cyan positive, preferably to ultra-violet light such as that known as H4 which is used without the cover glass, for from ½ to 10 minutes, the time interval being controlled in accordance with the intensity of the ultra-violet light used and density desired of the resultant color.

The ultra-violet light will decompose the dye-former in the polyvinyl alcohol layers of the transparency in proportion to the differing opacity of the Cyan color separation positive, and thus, a pattern of undecomposed and partially decomposed dye-former will remain after exposure.

The transparency is then placed in a Cyan coupling solution which is formed substantially as follows:

A solution which we shall term "Stock Solution A" is first provided and is a highly concentrated salt solution formed in accordance with the following formula:

*Stock Solution A*

Ingredient:                Approximate preferred amount
  Water _____ccs__ 1500
  Sodium chloride_____grams__ 500

In Stock Solution A it has been found that a fully concentrated salt solution would work practically as well as the above formula, that is, various similar salts may be used in place of sodium chloride such as sodium phosphate, sodium sulphate, potassium chloride, etc., in similar amounts. However, it is preferred that sodium chloride be used and that the amount of sodium chloride used be held to approximately 35.7 grams per 100 cc. of water.

A second solution which we shall term Stock Solution B is also provided as follows:

*Stock Solution B*

| Ingredient | Approximate Preferred Amount | Approximate Range |
|---|---|---|
| Stock Solution A ccs | 400 | |
| Sodium Hydroxide grams | 10 | 7 to 14 |

In forming Stock Solution B it has been found that potassium hydroxide, triethanolamine, or other high pH compounds may be substituted for the sodium hydroxide in equal amounts.

The actual Cyan coupling solution then is formed as follows:

SOLUTION III

| Ingredient | Approximate Preferred Amount | Approximate Range |
|---|---|---|
| Stock Solution A ccs | 200 | |
| Stock Solution B ccs | 50 | 30 to 70 |
| SS acid grams | 6 | 3 to 10 |

The SS acid referred to in the above Solution III formula can be defined as follows: 1 amino 8-naphthol 2,4-disulfonic acid. Similar amounts of S-acid or J-acid may be substituted for the SS acid if desired.

The transparency, which has been previously sensitized and exposed in accordance with the procedure described above, is immersed in the Cyan coupling solution (Solution III) for from 1 to 3 minutes, preferably 2 minutes, and then rinsed for approximately 5 seconds in plain Stock Solution A to remove excess coupling solution which might remain on the surface.

The Cyan coupling solution reacts with the undecomposed and partially decomposed dye-former which remains in the polyvinyl alcohol layers of the transparency after the exposure thereof to the ultra-violet light and thus forms a Cyan color.

Then to tone the resultant Cyan color of the transparency by shifting it to the exact blue-green color desired, and to fix it, the transparency is then immersed in a toning and fixing solution formed substantially as follows:

SOLUTION IV

| Ingredient | Approximate Preferred Amount | Approximate Range |
|---|---|---|
| Stock Solution A_____ccs__ | 250 | _____ |
| Cupric Chloride_____grams__ | 10 | 3 to 30 |

Although cupric chloride is preferred, similar amounts of cupric formate or copper sulphate may be substituted if desired.

The transparency is immersed in the toning and fixing solution (Solution IV) for a time interval of at least 1 minute, which time interval is the minimum to provide the desired fixing. Following this, the transparency is again rinsed in Stock Solution A for a sufficient length of time to remove the cupric chloride, and dried.

Referring to the drawings forming a part of these specifications, curve 10 illustrates the transmission characteristics of a transparency immediately after treatment with the sensitizing solution and Cyan coupling solution (Solutions I and III respectively). This curve shows peaks in the blue and in the high red areas with little transmission throughout the spectrum therebetween. Curve 11, however, indicates the shift in color obtained by subsequent treatment of the transparency with the copper solution (Solution IV). The resultant higher peak in the blue region of the spectrum consequently indicates a deeper and denser blue color in the transparency.

The above described process completes the procedure necessary for providing the Cyan color of the transparency.

To proceed to form a colored picture, the transparency having the Cyan imprint thereon is then resensitized by immersion for approximately 1 minute in the sensitizing solution (Solution I) and is then wiped, rinsed for 5 seconds in Solution II, and rewiped and dried as in preparing for the Cyan exposure. This again places the dye-former within the polyvinyl alcohol layers of the transparency.

At this point, the yellow master color separation positive from which the yellow (minus blue) image is to be obtained is superimposed upon the resensitized transparency and the assembly exposed to ultra-violet light for a time interval sufficient to bring about the desired decomposition of the dye-former in the polyvinyl alcohol layers 18 and 19 as effected by the color separation positive. The exposed transparency is then immersed in a yellow coupling solution formed as follows:

SOLUTION V

| Ingredient | Approximate Preferred Amount, ccs. | Approximate Range, ccs. |
|---|---|---|
| Stock Solution A_____ | 200 | _____ |
| Stock Solution B_____ | 50 | _____ |
| Phenol_____ | 1½ | ½ to 2 |

Similar amounts of acid salicylic or 3-methyl-1-phenyl-5-pyrazolone may be substituted for the phenol if desired.

The transparency is immersed in Solution V for from 30 seconds to 1 minute, preferably for 1 minute. This permits the ingredients in Solution V to properly react with the dye-former in the material of the polyvinyl alcohol layers. After the immersion in Solution V, the transparency is rinsed in plain Stock Solution A, and then immersed in Solution IV, and rinsed and dried as described above with respect to forming the Cyan color.

Curve 12 in the drawing indicates the transmission characteristics of a transparency when treated with a yellow coupling solution (Solution V). This curve shows high transmission in the red-orange-yellow and yellow-green regions of the spectrum with low transmission in the green and blue regions. Treatment of the transparency in the copper neutralizing solution (Solution IV) however, causes the color to be altered as indicated by curve 13 wherein a slight increase is noted in the green transmission and a considerable decrease in transmission results in the blue region of the spectrum. Thus, there results in the transparency a dense yellow color.

This completes the procedure for forming the yellow color in the transparency.

To provide a transparency with the magenta (minus green) color, the transparency must be again resensitized by immersion for approximately 1 minute in the sensitizing solution (Solution I) wiped, rinsed in Solution II, and again wiped and dried as in the sensitizing procedures preceding the Cyan and yellow exposures.

The transparency, which at this point is provided with the yellow and Cyan imprints and which now again contains the dye-former within the polyvinyl alcohol layers, is then superimposed with the magenta master color separation positive and exposed to ultra-violet light in a manner similar to that described above.

Following the exposure, the transparency is immersed in a magenta coupling solution formed substantially as follows:

SOLUTION VI

| Ingredient | Approximate Preferred Amount, ccs. | Approximate Range, ccs. |
|---|---|---|
| m-aminophenol_____ | .5 | .3 to .5 |
| in alcohol_____ | 15 | 5 to 20 |
| Stock Solution B_____ | 25 | 15 to 50 |
| Stock Solution A_____ | 225 | _____ |

In the foregoing formula the amount of Stock Solution A used should be an amount sufficient to total, with the amount of Stock Solution B, approximately 250 ccs. Similar amounts of resorcinol may be substituted for the m-aminophenol if desired.

The sensitized and exposed transparency is immersed in Solution VI for approximately 15 seconds, preferably, which permits the ingredients in Solution VI to react with the undecomposed and partially decomposed dye-former in the polyvinyl alcohol layers 18 and 19 to provide the transparency with the magenta color. Following this the transparency is rinsed, fixed and toned in Solution IV, rinsed again and dried as in the foregoing procedures.

The transparency following immersion in the magenta coupling solution (Solution VI) will be provided with a color as indicated by transmission curve 14 in the drawing. Curve 14 indicates high transmission in the red and orange regions of the spectrum, low transmission in the yellow and green regions, and moderately high transmission in the blue region. However, subsequent treatment of the transparency with the copper solution (Solution IV) results in the altering of the magenta color to a color as indicated by curve 15. Curve 15 indicates a decrease in transmission in the red and orange regions of the spectrum and also a slight decrease in the blue region. Thus, the resultant color will be shifted from a rose color to a reddish-blue color.

The transparency, or more particularly the polyvinyl alcohol layers thereof, at this stage, will, due to the accumulation of the three dyes, be provided with the image or pattern in substantially natural colors. However, since polyvinyl alcohol can be dissolved or softened by water, it may be desirable to protect it from moisture by lacquering, cross-linking, or other means. This protecting process, however, is only essential when it is desired that the resultant product be resistant to water.

The resultant transparency at this point can be projected by means of conventional projection devices to produce a two-dimensional image, for example, upon a remote screen.

It is to be noted, however, that during the entire coloring process, including the treatment of the transparency with the various solutions and exposure to light, the orientation of the molecules of the polyvinyl alcohol layers 18 and 19 is retained; also the dyes used are dichroic and combine with the molecules. As a result, three-dimensional photographic transparencies can be produced.

In forming three-dimensional photographic transparencies in accordance with the foregoing description, however, the transparencies may be formed as a single film 20 (Fig. 3) having both left and right eye members 21 and 22 respectively thereupon. The right eye imprint 22, it will be noted, is a mirror image of the left eye imprint 21. The master color separation positives with which the transparencies 20 are exposed are provided in triplicate, one for each of the Cyan, yellow and magenta colors. The master color separation positives are placed in superimposition with the sensitized photographic transparencies during the successive exposures in such a manner that, in the case of the triple layer structure described above, the light is confined by means such as frame 23 (Fig. 4) so as to strike only the polyvinyl alcohol layer 18 which is being exposed.

In the case of a triple layer structure wherein the base layer 17 contains ultra-violet absorbing ingredients, only the polyvinyl alcohol layer 18 which is directed toward the ultra-violet light will be exposed since the ultra-violet asborbing base layer 17 will prevent the light from passing to the polyvinyl alcohol layer 19 on the opposed side of the transparency. It is also apparent, of course, that in the case of a triple layer structure embodying an ultra-violet absorbing base layer 17, left and right eye imprints 21 and 22 can be exposed simultaneously on the opposite sides of the transparency, one imprint upon each of the polyvinyl alcohol layers 18 and 19.

The preferable construction of a transparency to be used for the present purposes, however, is a structure embodying only two superimposed layers, one being the isotropic base layer and the other being a single birefringent polyvinyl alcohol layer. In this instance, the right and left eye imprints 21 and 22 will both be formed simultaneously in spaced relation with each other in the single birefringent polyvinyl alcohol layer, and in order to obtain the desired three-dimensional effect the said images must be subsequently placed in proper superimposed stereoscopically displaced relation with each other by folding the transparencies as illustrated by the dotted lines in Fig. 3. Instead of using the two-layer structure mentioned above, a triple layer structure might be used wherein the isotropic base layer is not ultra-violet absorbing in a manner similar to said two-layer structure. In this case, however, both polyvinyl alcohol layers will be affected by the exposure thereof to ultra-violet light even when only one side of the structure is intended to be exposed to said light. This is due to the fact that the ultra-violet light will travel through the isotropic layer and effect the opposed polyvinyl alcohol layer. With this arrangement, one of said polyvinyl layers must be removed prior to folding the right and left eye imprints in proper superimposed relation with each other. The axis of polarization of the polyvinyl alcohol layer of each of the superimposed pictures thus will be positioned at an angle of 90° with respect to each other and preferably at 45° with respect to the vertical and horizontal. The pictures can be joined through the use of a conventional cement, such as a thermosetting resin, to form a composite structure which can be projected by use of a single projector. Such a resultant transparency when projected onto a screen, preferably of the metallic type, and viewed through polarizing analyzers, will appear to the viewer in three dimensions. It is obvious, of course, that where the printing has been done on both sides of the transparencies there is no need for removal of the layer 19 or subsequent superimposing of the picture portions.

To form three dimensional black and white pictures in accordance with this invention, a single master positive only is necessary. The transparency is first sensitized, then exposed under light to the master, coupled in the Cyan coupling solution, toned and fixed in the copper solution, and dried in the manner described with respect to forming a Cyan image. Following this the transparency is resensitized, exposed and processed as taught with respect to forming the yellow and magenta images, it being particularly pointed out, however, that the same master positive is used for each of the exposures. When the exposing and developing processes have been completed, the image upon the transparency will be black and white rather than in colors due to the fact that the single master positive was used. Three dimensional black and white pictures which can be projected can be made by forming right and left eye pictures in accordance with the foregoing teachings after exposure with a master positive having right and left eye images thereon.

Another method is to use the three layer structure described above and protect one layer with a removable lacquer while the other layer is processed, then protect the first processed side while processing the other side after removal of the lacquer.

While the foregoing description refers particularly to the processing of single colored slides it is to be understood that moving picture strip film may be similarly formed by applying the teachings herein.

In producing stereoscopic picture films in accordance with the foregoing description, it has been found that at times difficulty is encountered in that a ghost image of the pattern intended for one eye is visible to the other eye, and vice versa, when the eyes are viewing the respective images or pictures through light-polarizing analyzers. Such undesirable ghost images can be rendered substantially invisible by superimposing upon the transparency a layer 24 of light-polarizing material substantially in the manner diagrammatically shown in Figs. 5 and 6.

The resultant transparency is, as described, formed as a laminated structure having a base 17 of isotropic material and outer layers 18 and 19 of polyvinyl alcohol (birefringent) with the axes of polarization of the respective layers 18 and 19 being at right angles to one another as indicated by arrows 25 and 26 respectively. For example, image portion A (Fig. 6) is to be viewed by the left eye L and image portion B is to be viewed by the right eye R through suitable analyzers C and D, each positioned respectively before the eyes L and R. The image portion A is produced by light polarized in the direction of arrow 26 and image portion B is produced by light polarized in the direction of arrow 25. The arrows 26 and 25, therefore, indicate the axes of polarization and are normally at 90° relation with each other. In conventional stereoscopic viewing the analyzers C and D are positioned as indicated by dotted lines in Fig. 6 with their respective axes of polarization indicated by arrows 27 and 28, said axes of polarization of the analyzers thus being parallel with the axes of polarization of respective image portions A and B. In such instances the left eye analyzer C would be provided with an axis 27 of polarization which is substantially parallel with the axis 25 of polarization of image portion A while analyzer D has its axis 28 parallel with axis 26 of image portion B. This arrangement will cause image portion A to be visible only to the left eye L and image portion B to be visible only to the right eye R.

However, due to certain inherent characteristics of colored polarizing material of the character described, the image portion A while being readily visible to the left eye L through analyzer C will also cause a so-called ghost image to be visible to the right eye R through analyzer D. A similar effect occurs with respect to image portion B. To overcome such ghost images the sheet 24 of light-polarizing material is positioned in superimposed relation with the transparency and on the side thereof opposite that of the analyzers. The light-polarizing means 24 is disposed with its axis of polarization extending vertically as indicated by arrow 29 or horizontally at right angles to arrow 29 as desired.

To eliminate the ghost images described above, the axes of the respective analyzers C and D must be altered from their normal position. This may be done by either forming the analyzers C and D initially with their axes of polarization angled from the conventional directions such as indicated by arrows 30 and 31 or by tilting or rotating the analyzers themselves to the positions shown in full lines in Fig. 6 whereupon the axes of polarization thereof will be shifted to the directions indicated by arrows 30 and 31 respectively. The shifting or altering of the axes of polarization of the analyzers C and D is only of an amount sufficient to cause the light passing through the transparency and light-polarizing means 24 to be varied in density by an amount sufficient to match the density of the ghost images and thereby render said images substantially invisible to the observer.

While the foregoing description refers particularly to the use of a transparency formed as a laminated structure having outer layers 18 and 19 of birefringent material wherein the axes of polarization of the respective layers 18 and 19 are disposed at right angles to one another as indicated by arrows 25 and 26 respectively in Figs. 2, 5 and 6, it is to be understood that the actual disposition of the axes may be at any angle throughout 360°. The respective relations of the axes of the two layers of birefringent material, however, must always be maintained at 90° to one another and the axis of the polarizing means 24 equidistant therebetween. Thus, although the example shown in the drawings shows the axes 25 and 26 disposed at angles 45° from the horizontal and vertical and 90° from one another, it is to be understood that a structure wherein one of the axes 25 or 26 is disposed vertically and the other thereof is disposed horizontally, would work as well, as well as any other angular relation throughout 360°.

Such a ghost elimination procedure results in the formation of three-dimensional pictures which are of markedly superior quality.

Although the axes of polarization of the analyzers C and D must be rotated as described above to vary the density of the transparency by an amount sufficient to cause the ghost images to disappear, it is to be understood that the amount of rotation necessary to bring about this result, in most instances, is only slight and is never such as to have any appreciable effect upon the selected visibility of the image portions A and B as viewed by the respective eyes L and R through the analyzers C and D. This is true in all instances and the direction of rotation of the analyzers is controlled according to the direction of orientation of the axis 29 of the polarizing means 24, that is, whether said axis 29 is retained in a vertical or horizontal position.

Although the foregoing description refers to the use particularly of ultra-violet light for exposing the transparencies, it is to be understood that other actinic lights could be used. For rapid processing U. V. lamps of much higher intensity would probably be used with much shorter exposure time cycles.

From the foregoing it is apparent that all of the objects and advantages of the invention have been accomplished. It is apparent, however, that many changes may be made in the means, method and formulae described without departing from the spirit of the invention, and it is therefore desired that all matter shown and described be considered as illustrative and not in a limiting sense.

I claim:

1. In the art of producing a colored three-dimensional picture embodying stereoscopically displaced picture components, which components are the composite of plural areas of different colors in a single film of polyvinyl alcohol having its molecules highly oriented in a direction disposed substantially at 45° with respect to the horizontal meridian of said film, the steps of first sensitizing said film with a dye-forming naphthanil diazo blue B salt solution, exposing said sensitized film to ultra-violet light through a Cyan master color separation positive embodying a pair of mirror images which are stereoscopic complements of each other for causing decomposition of said sensitizer in accordance with the varying opacity of said Cyan master color separation positive, subjecting said exposed film to a Cyan coupling solution containing a relatively high concentration of approximately 35.7 grams per 100 ccs. water of salt selected from a group consisting of sodium phosphate, sodium sulphate, sodium chloride, and potassium chloride, and a coupler compound which will couple with the undecomposed dye-forming sensitizer for a time interval sufficient to permit said Cyan coupling solution to react with said undecomposed dye-forming sensitizer in said film and thereby produce the desired Cyan colored stereo pair of picture areas and simultaneously rendering the molecules light polarizing, treating said film with a neutralizing cupric chloride solution to cause said Cyan colored picture areas to assume the desired shade and to stop the action of and to neutralize said coupler, thereby reconditioning the polyvinyl film for resensitization without discoloration and, by reason of said high salt concentration in said Cyan coupling solution, preventing disorientation of the molecules which have been rendered dichroic by said Cyan coupling solution, and successively repeating the above steps for at least two additional colors, one comprising resensitizing the film with said dye-forming naphthanil diazo blue B salt solution, exposing the resensitized film to ultra-violet light through a yellow master color separation positive having image characteristics similar to the Cyan master color separation positive and supported in proper superimposed positional relation with the first formed picture areas for decomposing said sensitizer in accordance with the varying opacity of said yellow master color separation positive, subjecting said exposed film to a yellow coupling solution containing a relatively high concentration of approximately 35.7 grams per 100 ccs. water of salt selected from the group consisting of sodium phosphate, sodium sulphate, sodium chloride and potassium chloride, and a coupler compound which will couple with the undecomposed dye-forming sensitizer for a time interval sufficient to produce the desired yellow color by reaction with the undecomposed sensitizer, and again treating said film with said cupric chloride solution for producing the desired yellow shade and to stop the action of and to neutralize said coupler, and the other comprising again re-sensitizing the film and exposing said film to ultra-violet light through a magenta color separation positive having similar characteristics to said first-mentioned color separation positives and supported in proper superimposed positional relation with said first formed areas for decomposing said sensitizer in accordance with the varying opacity of said magenta master color separation positive, subjecting said exposed film to a magenta coupling solution containing a relatively high concentration of approximately 35.7 grams per 100 ccs. water of salt selected from the group consisting of sodium phosphate, sodium sulphate, sodium chloride and potassium chloride, and a coupler compound which will couple with the undecomposed dye-forming sensitizer for a time interval sufficient to produce the desired magenta color by reaction with the undecomposed sensitizer, and thereafter treating said film with said cupric chloride solution to cause the magenta colored areas to assume the desired shade and color and to stop the action of and to neutralize said coupler, thereafter folding said treated sheet of polyvinyl alcohol to position the resultant mirror picture areas in proper stereoscopic relation with each other and securing said superimposed layers together in said relation whereby the axes of polarization of said superimposed layers due to said folding will assume a desired 90° relation with each other.

2. In the art of producing a colored three-dimensional picture embodying stereoscopically displaced picture components, which components are the composite of plural areas of different colors in a single film of polyvinyl alcohol having its molecules highly oriented in a direction disposed substantially at 45° with respect to the horizontal meridian of said film, the steps of first sensitizing said film with a dye-forming naphthanil diazo blue B salt solution, exposing said sensitized film to ultra-violet light through a Cyan master color separation positive embodying a pair of mirror images which are stereoscopic complements of each other for causing decomposition of said sensitizer in accordance with the varying opacity of said Cyan master color separation positive, subjecting said exposed film to a Cyan coupling solution of water containing a substantially complete saturation of salt selected from a group consisting of sodium phosphate, sodium sulphate, sodium chloride, and potassium chloride, and a coupler compound which will couple with the undecomposed dye-forming sensitizer for a time interval sufficient to permit said Cyan coupling solution to react with said undecomposed dye-forming sensitizer in said film and thereby produce the desired Cyan colored stereo pair of picture areas and simultaneously rendering the molecules light polarizing, treating said film with a neutralizing cupric chloride solution to cause said Cyan colored picture areas to assume the desired shade and to stop the action of and to neutralize said coupler, thereby reconditioning the polyvinyl film for resensitization without discoloration and, by reason of said substantially complete saturation of salt in said Cyan coupling solution, preventing disorientation of the molecules which have been rendered dichroic by said Cyan coupling solution, and successively repeating the above steps for at least two additional colors, one comprising resensitizing the film with said dye-forming naphthanil diazo blue B salt solution, exposing the resensitized film to ultra-violet light through a yellow master color separation positive having image characteristics similar to the Cyan master color separation positive and supported in proper superimposed positional relation with the first formed picture areas for decomposing said sensitizer in accordance with the varying opacity of said yellow master color separation positive, subjecting said exposed film to a yellow coupling solution of water having a substantially complete saturation of salt selected from the group consisting of sodium phosphate, sodium sulphate, sodium chloride and potassium chloride, and a coupler compound which will couple with the undecomposed dye-forming sensitizer for a time interval sufficient to produce the desired yellow color by reaction with the undecomposed sensitizer, and again treating said film with said cupric chloride solution for producing the desired yellow shade and to stop the action of and to neutralize said coupler, and the other comprising again resensitizing the film and exposing said film to ultra-violet light through a magenta color separation positive having similar characteristics to said first-mentioned color separation positives and supported in proper superimposed positional relation with said first formed areas for decomposing said sensitizer in accordance with the varying opacity of said magenta master color separation positive, subjecting said exposed film to a coupling solution of water containing a substantially complete saturation of salt selected from the group consisting of sodium phosphate, sodium sulphate, sodium chloride and potassium chloride, and a coupler compound which will couple with the undecomposed dye-forming sensitizer for a time interval sufficient to produce the desired magenta color by reaction with the undecomposed sensitizer, and thereafter treating said film with said cupric chloride solution to cause the magenta colored areas to assume the desired shade and color and to stop the action of and to neutralize said coupler, thereafter folding said treated sheet of polyvinyl alcohol to position the resultant mirror picture areas in proper stereoscopic relation with each other and securing said superimposed layers together in said relation whereby the axes of polarization of said superimposed layers due to said folding will assume a desired 90° relation with each other.

3. In the art of producing a colored three-dimensional picture embodying stereoscopically displaced picture components, which components are the composite of plural areas of different colors in a single film of polyvinyl alcohol having its molecules highly oriented in a direction disposed substantially at 45° with respect to the horizontal meridian of said film, the steps of first sensitizing said film with a dye-forming naphthanil diazo blue B salt solution, exposing said sensitized film to ultra-violet light through a Cyan master color separation positive embodying a pair of mirror images which are stereoscopic complements of each other for causing decomposition of said sensitizer in accordance with the varying opacity of said Cyan master color separation positive, subjecting said exposed film to a Cyan coupling solution of water containing a relatively high concentration of salt selected from a group consisting of sodium phosphate, sodium sulphate, sodium chloride, and potassium chloride of a magnitude of approximately 500 grams of said salt per 1500 ccs. water, and a coupler compound which will couple with the undecomposed dye-forming sensitizer for a time interval sufficient to permit said Cyan coupling solution to react with said undecomposed dye-forming sensitizer in said film and thereby produce the desired Cyan colored stereo pair of picture areas and simultaneously rendering the molecules light polarizing, treating said film with a neutralizing cupric chloride solution to cause said Cyan colored picture areas to assume the desired shade and to stop the action of and to neutralize said coupler, thereby reconditioning the polyvinyl film for resensitization without discoloration and, by reason of said high salt concentration in said Cyan coupling solution, preventing disorientation of the molecules which have been rendered dichroic by said Cyan coupling solution, and successively repeating the above steps for at least two additional colors, one comprising resensitizing the film with said dye-forming naphthanil diazo blue B salt solution, exposing the resensitized film to ultra-violet light through a yellow master color separation positive having image characteristics similar to the Cyan master color separation positive and supported in proper superimposed positional relation with the first formed picture areas for decomposing said sensitizer in accordance with the varying opacity of aid yellow master color separation positive, subjecting said exposed film to a yellow coupling solution having a high concentration of salt selected from the group consisting of sodium phosphate, sodium sulphate, sodium chloride, and potassium chloride of a magnitude of approximately 500 grams of said salt per 1500 ccs. water, and a coupler compound which will couple with the undecomposed dye-forming sensitizer for a time interval sufficient to produce the desired yellow color by reaction with the undecomposed sensitizer, and again treating said film with said cupric chloride solution for producing the desired yellow shade and to stop the action of and to neutralize said coupler, and the other comprising again resensitizing the film and exposing said film to ultra-violet light through a magenta color separation positive having similar charactersitics to said first-mentioned color separation positives and supported in proper superimposed positional relation with said first formed areas for decomposing said sensitizer in accordance with the varying opacity of said magenta master color separation positive, subjecting said exposed film to a coupling solution having a high concentration of salt selected from the group consisting of sodium phosphate, sodium sulphate, sodium chloride, and potassium chloride of a magnitude of approximately 500 grams of said salt per 1500 ccs. water and a coupler compound which will couple with the undecomposed dye-forming sensitizer for a time interval sufficient to produce the desired magenta color by reaction with the undecomposed sensitizer, and thereafter treating said film with said cupric chloride solution to cause the magenta colored areas to assume the desired shade and color and to stop the action of and to neutralize said coupler, thereafter folding said treated sheet of polyvinyl alcohol to position the resultant mirror picture areas in proper stereoscopic relation with each other and securing said superimposed layers together in said relation whereby the axes of polarization of said superimposed layers due to said folding will assume a desired 90° relation with each other.

4. In the art of producing a colored three-dimensional picture embodying stereoscopically displaced picture components, which components are the composite of plural areas of different colors in a single film of polyvinyl alcohol having its molecules highly oriented in a direction disposed substantially at 45° with respect to the horizontal meridian of said film, the steps of first sensitizing said film with a dye-forming naphthanil diazo blue B salt solution, exposing said sensitized film to ultra-violet light through a first selected master color separation positive which sensitized film is to be thereafter subjected to a dye-forming coupling compound selected from a group consisting of Cyan, yellow and magenta coupling compounds, each master color separation positive embodying a pair of mirror images which are stereoscopic complements of each other for causing decomposition of said sensitizer in accordance with the varying opacity of said first selected master color separation positive, said master color separation positive being selected in accordance with the color of the pattern to be formed, subjecting said exposed film to a coupling solution containing a coupling compound selected from the group consisting of Cyan, yellow and magenta coupling compounds and of the color required in accordance with the color separation characteristics of said first selected master color separation positive, said coupling solution containing a relatively high concentration of approximately 35.7 grams per 100 ccs. water of salt selected from a group consisting of sodium phosphate, sodium sulphate, sodium chloride, and potassium chloride, and a coupler compound which will couple with the undecomposed dye-forming sensitizer, said subjecting being continued for a time interval sufficient to permit said selected coupling solution to react with said undecomposed dye-forming sensitizer in said film and produce the first desired colored stereo pair of picture areas and simultaneously rendering the molecules light polarizing, treating said film with a neutralizing solution selected from the group consisting of cupric chloride, cupric formate and copper sulphate to cause said colored picture areas to assume the desired shade and to stop the action of and to neutralize said coupler, thereby reconditioning the polyvinyl film for resensitization without discoloration and, by reason of said high salt concentration in said first selected coupling solution, preventing disorientation of the molecules which have been rendered dichroic by said coupling solution, and successively repeating the above steps for at least two additional colors, one comprising resensitizing the film with said dye-forming naphthanil diazo blue B salt solution, selecting a second master color separation positive in accordance with the second color pattern to be formed, supporting said second master color separation positive in proper superimosed positional relation with the first formed picture areas, exposing the resensitized film and said second master color separation positive to ultra-violet light for decomposing said sensitizer in accordance with the varying opacity of said second selected master color separation positive, subjecting said exposed film to a second coupling solution of the color required in accordance with the color separation characteristics of said second master color separation positive, said coupling solution containing a relatively high concentration of approximately 35.7 grams per 100 ccs. water of salt selected from a group consisting of sodium phosphate, sodium sulphate, sodium chloride, and potassium chloride, and a coupler compound which will couple with the undecomposed dye-forming sensitizer, said subjecting being continued for a time interval sufficient to produce the desired second color by reaction with the undecomposed sensitizer, again treating said film with a neutralizing solution selected from the group consisting of cupric chloride, cupric formate and copper sulphate for producing the desired shade of color and to stop the action of and to neutralize said coupler, and again resensitizing the film with the dye-forming naphthanil diazo blue B salt solution and exposing said film to ultra-violet light through the remaining color separation positive in accordance with the remaining color pattern to be formed and which is supported in proper superimposed relation with said first formed areas for decomposing said sensitizer in accordance with the opacity of said remaining master color separation positive, subjecting said exposed film to a coupling solution containing the color required according to the color separation characteristics of said remaining master color separation positive, said coupling solution containing a relatively high concentration of approximately 35.7 grams per 100 ccs. water of salt selected from a group consisting of sodium phosphate, sodium sulphate, sodium chloride, and potassium chloride, and a coupler compound which will couple with the undecomposed dye-forming sensitizer, said subjecting being continued for a time interval sufficient to permit said coupling solution to react with said undecomposed dye-forming sensitizer and produce the third color desired and thereafter treating said film with a neutralizing solution selected from the group consisting of cupric chloride, cupric formate and copper sulphate to cause said colored areas to assume the desired shade of color and to stop the action of and to neutralize said coupler, thereafter folding said treated sheet of polyvinyl alcohol to position the resultant mirror picture areas in proper stereoscopic relation with each other and securing said superimposed layers together in said relation whereby the axes of polarization of said superimposed layers due to said folding will assume a desired 90° relation with each other.

References Cited in the file of this patent

UNITED STATES PATENTS

| Number | Name | Date |
| --- | --- | --- |
| 1,552,826 | Comstock | Sept. 8, 1925 |
| 1,710,455 | Langguth et al. | Apr. 23, 1929 |
| 1,760,780 | Schmidt et al. | May 27, 1930 |
| 2,289,714 | Land | July 14, 1942 |
| 2,299,906 | Land | Oct. 27, 1942 |
| 2,674,156 | Mahler | Apr. 6, 1954 |

FOREIGN PATENTS

| Number | Country | Date |
| --- | --- | --- |
| 536,714 | Great Britain | May 23, 1941 |